United States Patent [19]

Fritsch

[11] Patent Number: 4,768,967
[45] Date of Patent: Sep. 6, 1988

[54] LATCH FOR REMOVABLE CONTROL UNIT OF A MOTOR CONTROL CENTER

[75] Inventor: Ronald J. Fritsch, Sussex, Wis.

[73] Assignee: Eaton Corporation, Cleveland, Ohio

[21] Appl. No.: 66,572

[22] Filed: Jun. 26, 1987

[51] Int. Cl.[4] ............................................ H01R 13/62
[52] U.S. Cl. .................................... 439/152; 439/310; 439/372
[58] Field of Search ............... 439/152, 153, 296, 304, 439/310, 342, 345, 372; 361/338, 339, 391

[56] References Cited

U.S. PATENT DOCUMENTS

| | | | |
|---|---|---|---|
| 2,227,967 | 1/1941 | Favre | 361/356 |
| 2,530,945 | 11/1950 | Chapman et al. | 361/331 |
| 3,054,023 | 9/1962 | Blecker et al. | 361/338 |
| 3,140,905 | 7/1964 | Trotter et al. | 439/372 |
| 3,300,751 | 1/1967 | Fraley | 339/91 |
| 3,482,143 | 12/1969 | Stark et al. | 361/338 |
| 3,495,135 | 2/1970 | Paape | 361/338 |
| 3,801,757 | 4/1974 | Carissimi et al. | 200/50 B |
| 4,152,038 | 5/1979 | Inouye et al. | 339/75 M |

FOREIGN PATENT DOCUMENTS 71652 1/1960 France ............................... 439/372

OTHER PUBLICATIONS

Furnas Electric Co. Catalog 89-BTB, Cover Page & pp. C1, C2, C3 and C4.

Primary Examiner—J. Patrick McQuade
Attorney, Agent, or Firm—L. G. Vande Zande

[57] ABSTRACT

A lever pivotally mounted on a forward brace of a removable control unit abuts a pin on the cabinet for limiting direct insertion of the unit to a depth insufficient to effect electrical engagement of plug-in connectors of the unit with bus bars in a motor control cabinet, such engagement requiring subsequent pivotal movement of the lever which automatically latches the unit in the cabinet. A compound movement of the lever is required to release the latch and separate the plug-in connectors from the bus bar. A detent structure maintains the lever in a first position for inserting the control unit into the cabinet and padlocking provisions are provided to insure the lever remain in that position when desired, thereby blocking full insertion of the control unit into the cabinet. Interlocking means between the operator assembly for the control unit and the lever prevent pivotal movement of the lever and consequently engagement or separation of the plug-in connectors and bus bars when the control apparatus is in its ON condition.

8 Claims, 5 Drawing Sheets

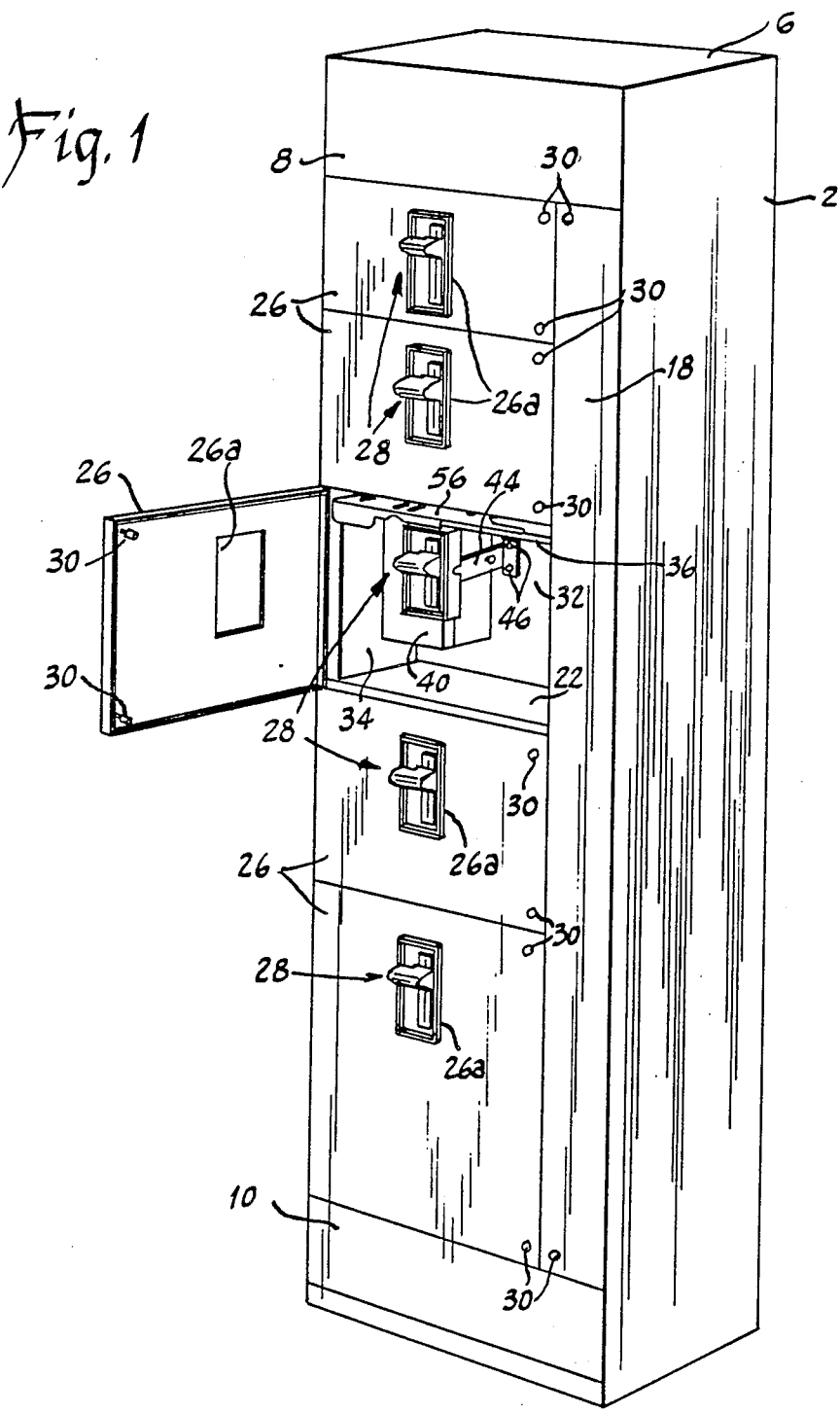

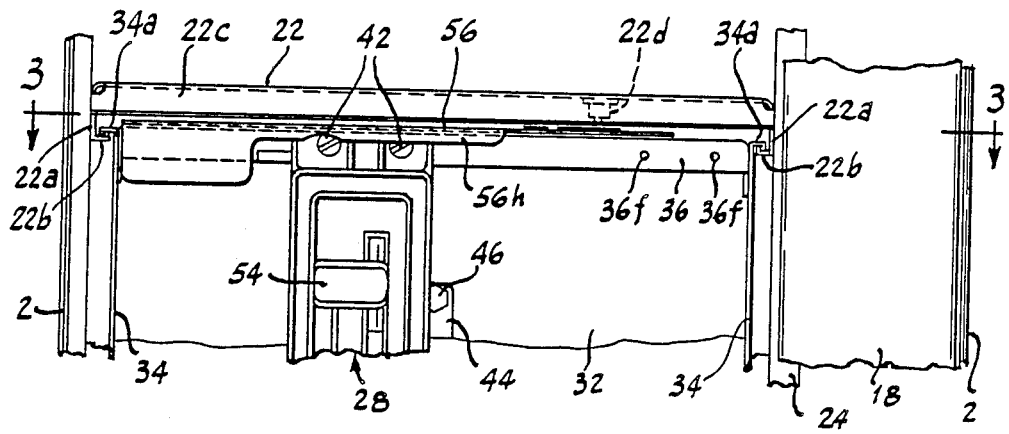
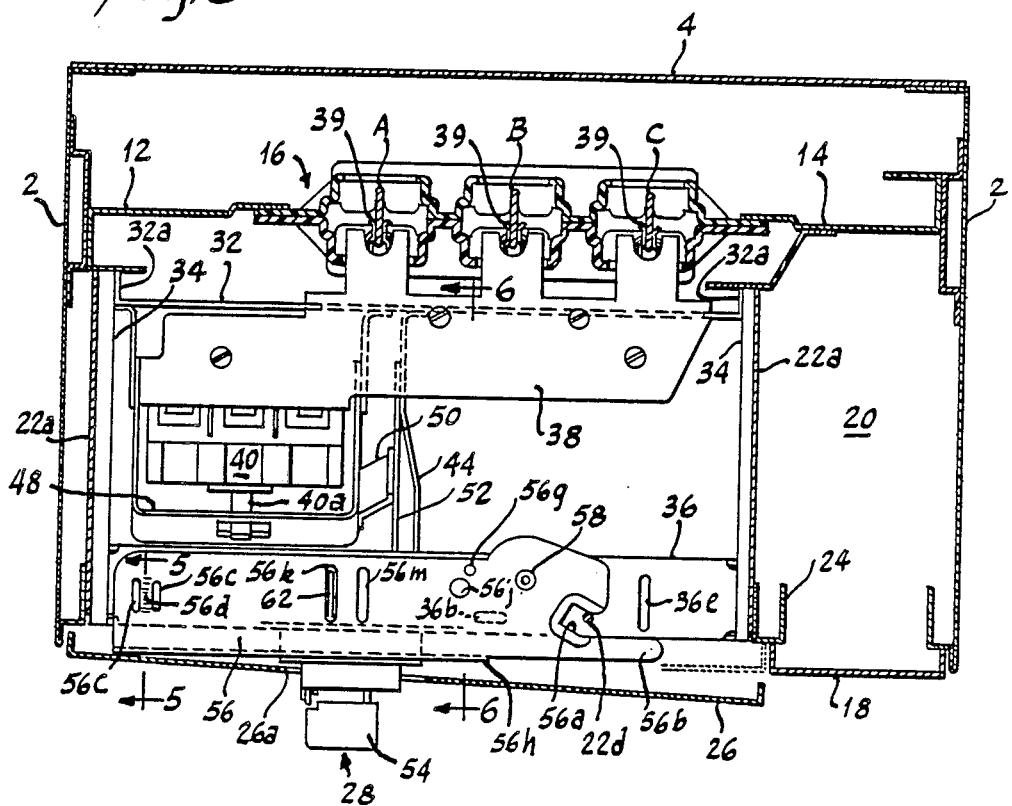

LATCH FOR REMOVABLE CONTROL UNIT OF A MOTOR CONTROL CENTER

CROSS REFERENCE TO RELATED APPLICATIONS

This application is related to copending applications Ser. Nos. 066,571, filed June 26, 1987 entitled "Operator Mechanism Having Reduced Handle Throw and Improved Handle Lock" in the name of Ronald J. Fritsch and Francis A. Lubinski and 066,573, filed June 26, 1987, entitled "Plug-In Connector Module for a Removable Control Unit of a Motor Control Center" in the name of Ronald J. Fritsch and Allan E. Grams, each assigned to the assignee of this application.

BACKGROUND OF THE INVENTION

This invention relates to removable control units of motor control centers and more particularly relates to a latch mechanism for retaining the control unit in position within the motor control center cabinet.

Motor control centers comprise a cabinet having a plurality of vertically arranged compartments open to a forward face of the cabinet. The cabinet is provided with a plurality of doors individual to each compartment for closing off the same. A plurality of electrical bus bars are mounted within the cabinet at the rear, the bus bars being oriented vertically to traverse the plurality of compartments. The cabinets are adapted to be mounted side by side with provisions for connecting the vertical bus bars of each cabinet to a common source of supply through horizontal busing extending between the cabinets. In some instances the motor control cabinets are made to be double sided or back-to-back wherein the cabinet is extended to the rear to accommodate a second set of compartments open to the opposite side of the cabinet as the first set of compartments, each set of compartments commonly sharing the vertically oriented bus bars which in this instance are centrally located within the cabinet.

The compartments each contain a removable control unit which may be slidably inserted or removed from the compartment when the respective door is open. The unit comprises a sheet metal structure which serves as a mounting panel for various motor control components as required. The cabinets are structured to enable the compartment sizes to be varied as required, customarily in six inch vertical increments, to provide the motor control center with the flexibility of performing a wide range of control applications. Each control unit is provided with a plurality of stab-on electrical connectors at the rear of the unit for making electrical connection between the bus bars and the unit by insertion of the unit within the compartment. In view of the large current carrying capacity of the bus bars, the spring pressure of the stab-on contacts creates a high insertion force for such plug-in electrical connection. Moreover, the weight and bulk of the larger control units increases the difficulty of inserting the control unit to make electrical connections to the bus bars.

The control units are also provided with latching means which engage with fixed members of the cabinet to prevent the unit from being unintentionally uncoupled from the bus bars. In some cases the latch means are spring loaded plungers or levers carried by the unit and which are biased laterally outwardly of the unit to engage the cabinet along the respective sides of the control unit. The plungers or levers may require the installer to physically retract them while inserting the control unit into the compartment, or may be provided with cam surfaces which enable the latch members to be cammed aside during insertion of the unit. Upon removal of the control unit from the cabinet, the operator is required to physically manipulate the latch means to release the same while pulling the unit outwardly to uncouple the stab-on connectors from the bus bars. Still another form of latch has quarter turn fasteners provided at two or more corners of the control unit or at the compartment opening which require the installer to rotate the latches with a tool to either latch or unlatch the devices. Latches of this type do not operate automatically upon insertion, and are preferably not utilized as the sole means of latching the unit within the compartment.

As mentioned above, the insertion force for the electrical connectors to the bus bars can be very high and to this end mechanisms have been provided in motor control center removable units or in the cabinets thereof to assist in the stab-on or withdrawal movements between the electrical connector and the bus bar. For example, it is known to pivotally mount a lever on a control unit such that one end of the lever engages with a portion of the cabinet upon partial insertion of the control unit into the compartment. Final movement of the control unit into the compartment or initial movement of the control unit out of the compartment, during which movement the electrical connections are either made or broken, is effected by pivoting the lever to a position flush with the front face of the control unit.

SUMMARY OF THE INVENTION

The invention disclosed herein provides a latch mechanism for a removable control unit of a motor control center which incorporates a lever for advantageously driving the control unit into engagement with electrical bus bars of the control center, the latch automatically engaging when the lever is in position indicating full insertion of the control unit. The lever also serves to block engagement of the electrical connectors with the bus bars unless the lever is in a predisposed position, the means are provided for locking the lever in a blocking position whereby the control unit may be partially withdrawn from the cabinet for service by a maintenance person without having the electrical connectors engage the bus bars. The lever may also be interlocked to the operating mechanism for the control apparatus of the control unit whereby the control apparatus is required to be electrically deenergized before the lever may be moved to disengage the control unit connectors from the bus bars.

The invention and its advantages will be more readily apparent when reading the following description and claims in conjunction with the accompanying drawings.

BRIEF DESCRIPTION OF THE DRAWINGS

FIG. 1 is a perspective view of a motor control center having removable control units incorporating the latch of this invention;

FIG. 2 is a fragmentary view of a portion of the cabinet of the motor control center showing the upper edge of a compartment and a control unit wherein the latch of this invention is located.

FIG. 3 is a transverse cross-sectional view of the motor control center of this invention taken along the line 3—3 of FIG. 2 showing a control unit latched in a fully inserted position within the motor control center cabinet.

DESCRIPTION OF THE PREFERRED EMBODIMENT

Figure 4:
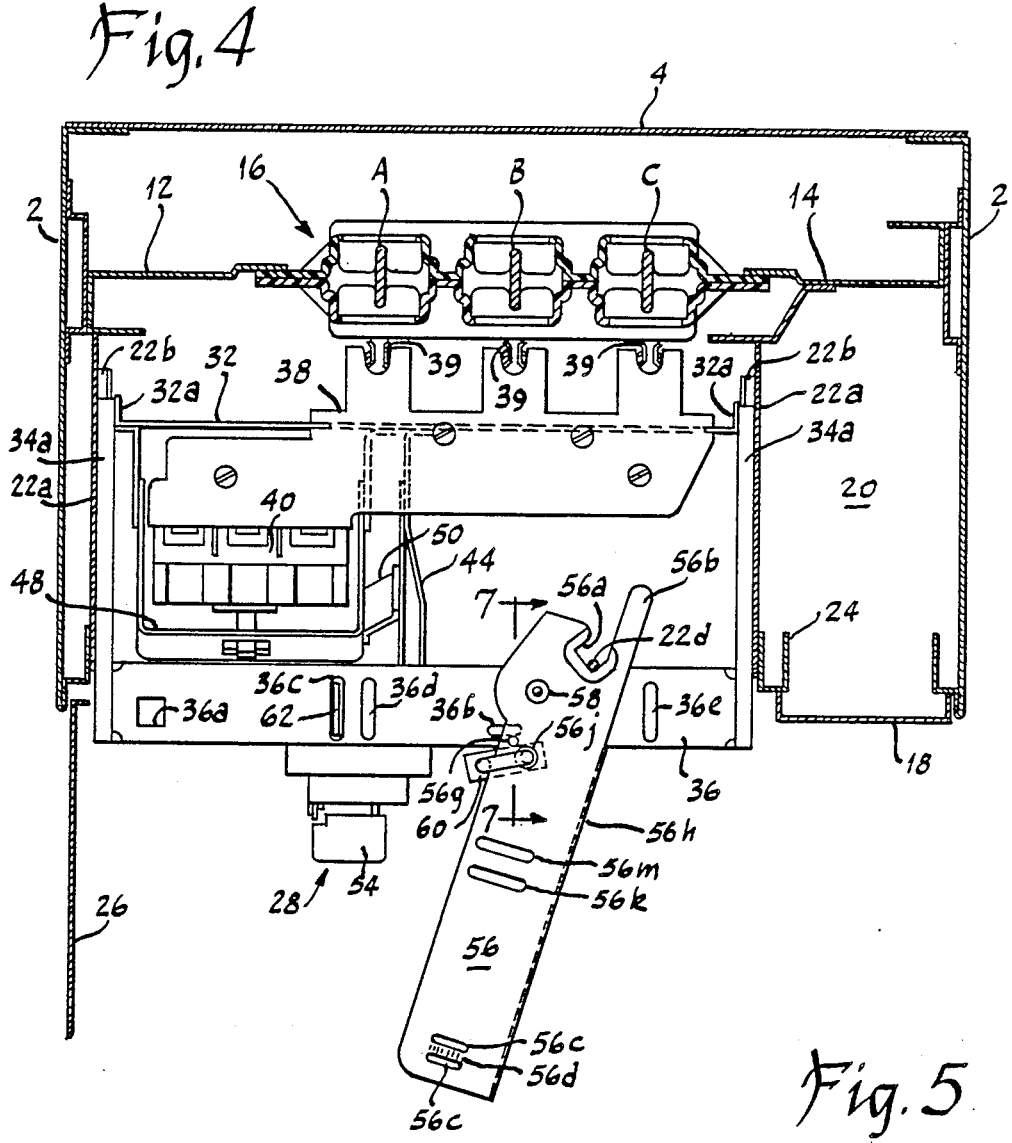
FIG. 4 is a transverse cross-sectional view similar to FIG. 3 but showing the control unit in a partially inserted position, which position may be utilized as a test or service position for the control unit.

A motor control center is shown in perspective in FIG. 1. Referring also to FIG. 3, the motor control center cabinet may be seen to be assembled from a plurality of sheet steel panels comrising side panels 2, a rear panel 4, a top panel 6 and a corresponding bottom panel (not shown) and a top and bottom front access covers 8 and 10. An interior wall is formed by sheet steel channel members 12 and 14 which are attached to the side walls 2 in forwardly spaced relation to the rear wall 4. An insulator assembly 16 is attached to the channels 12 and 14 along the vertical length thereof. The insulator assembly 16 supports and surrounds vertically extending bus bars A, B and C. The insulator assembly is provided with vertically spaced, horizontally aligned openings 40 along its vertical length to provide plug-in access to the bus bars A, B and C by the control unit plug-in connectors to be described later.

The front portion of the cabinet has a narrow vertically oriented door 18 along the right-hand edge of the cabinet. While not specifically shown, door 18 is hinged along the right-hand edge to swing outwardly, thereby exposing a wiring area 20 within the cabinet. The remaining space at the front of the cabinet to the left of door 18 is divided into several compartments by horizontally disposed pans 22, only one of which can be seen in the open compartment of the control center shown in FIG. 1. Referring to FIG. 2, each pan 22 has a pair of downwardly turned flanges 22a along its lateral edges. Each flange 22a terminates in an inwardly disposed upturned channel 22b extending the full depth of the flange 22a. As seen in FIG. 3, the pan 22 is attached to the left-hand side panel 2 at its forward left-hand corner, to the interior channels 12 and 14 at its rear corners and to a U-shaped channel 24 at its forward righthand corner. Pan 22 also has a downwardly projecting flange 22c extending along its forward edge. As is customary practice in motor control centers, the respective cabinet members to which pan 22 is mounted are formed to accommodate pans in predetermined vertical intervals to permit the size of the compartments to be custom made as required for the particular control application. Each of the compartments defined by adjacent pans 22 is provided with a door 26 which is hingedly mounted along the left-hand edge thereof to the left-hand side panel 2. Each door is provided with an access opening 26a through which an operator assembly 28 of the removable control unit projects when the door 26 is closed. The doors 18 and 26 are provided with pairs of releasable fasteners 30 for securing the doors in the closed position.

Each removable control unit comprises a rear panel 32 having rearwardly turned flanges 32a formed along its lateral edges and a pair of side panels 34 which are attached along the rear edge thereof to the flanges 32a. An inverted U-shaped channel 36 having downwardly turned flanges at its opposite ends is secured between the side panels 34 at the upper, forward ends thereof to provide forward bracing and stability for the control unit. Each of the side panels 34 of the control unit are formed to have an outwardly and downwardly projecting flange 34a formed along the upper edge thereof, the flange 34a being received in the respective channel 22b of pan 22 to slidably support the control unit to the motor control center cabinet. A plug-in connector assembly 38 is attached to the rear panel 32 by suitable means (not shown). The connector assembly 38 is more fully shown and described in the aforementioned patent application entitled "Plug-in Connector Module for a Removable Control Unit of a Motor Control Center". Also mounted to the rear panel 32 is the control apparatus required for the particular application of the respective control unit. In this exemplary embodiment the control apparatus comprises a molded case circuit breaker 40. Although not specifically shown, the terminals of circuit breaker 40 are electrically connected to the connector assembly 38. Connector assembly 38 includes stab-on connector clips 39 which plug onto the bus bars A, B and C when the control unit is fully inserted within the respective compartment of the motor control center to electrically connect circuit breaker 40 to the bus bars A-C. The operator assembly 28 for the control unit is mounted at its upper end to brace 36 by screws 42 (FIG. 2). A bracket 44 extends rearwardly from the central portion of operator assembly 28 to the rear panel 32 and is attached thereto by screws 46 to provide a third point of support for operator assembly 28. The operator assembly is more fully shown and described in the aforementioned copending application entitled "Operator Mechanism Having Reduced Handle Throw and Improved Handle Lock". For purposes of disclosure relating to this invention, operator assembly 28 comprises a bail 48 pivotally disposed over the handle 40a of circuit breaker 40 and reciprocally driven by an operator handle 54 through a connecting link 50 and drive link 52.

Figure 5:
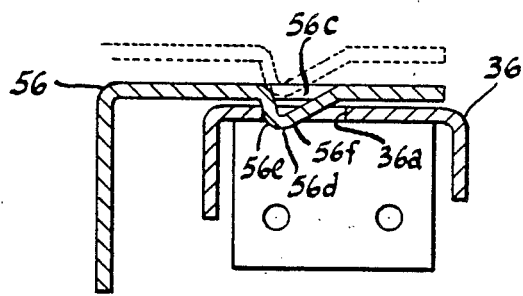
FIG. 5 is a cross-sectional view taken along the line 5—5 in FIG. 3 showing a catch structure for the latch of this invention.
Figure 8:
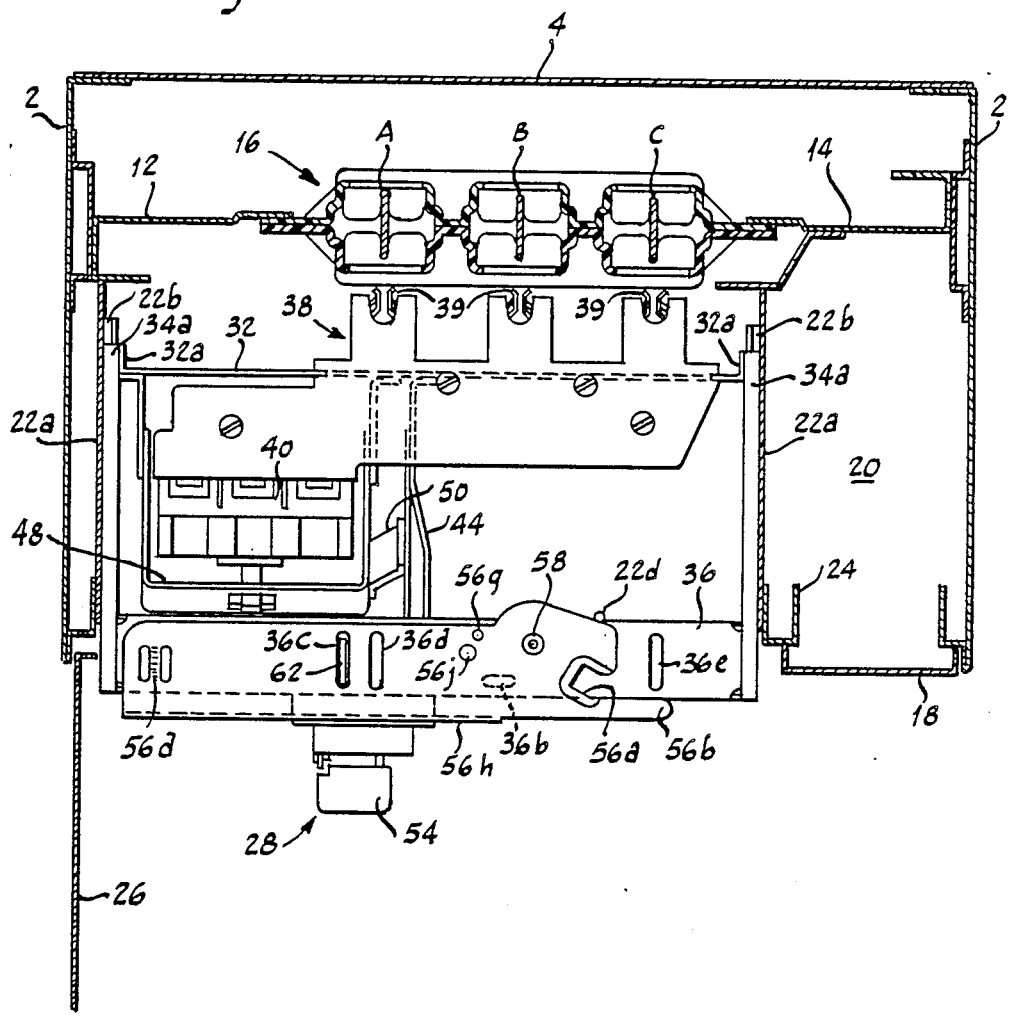
FIG. 8 is a transverse cross-sectional view similar to FIGS. 3 and 4 showing the latch lever positioned in a latched position prior to insertion of the control unit within the compartment, the lever in this position cooperating with a projection on the cabinet to thereby block full insertion of the control unit into the cabinet.

The control unit latch of this invention comprises a lever 56 pivotally mounted to the upper surface of brace 36 by a shouldered rivet 58. Lever 56 has a first end which projects to the right of rivet 58 as viewed in FIG. 3, the first end containing a rectangular slot 56a and a projecting tongue 56b adjacent the slot 56a. A second end of the lever 56 projects to the left of rivet 58 as viewed in FIG. 3 and is provided with a pair of closely spaced slots 56c adjacent the left-handmost end thereof which define a narrow web 56d of material between the slots 56c. The lever 56 is pivotally movable between a first position shown in FIG. 4 wherein the length of the lever extends substantially in the direction of insertion movement of the control unit into the motor control cabinet and a second position as shown in FIGS. 3 and 8 wherein the length of the lever is parallel with the front face of the control unit defined by the brace 36 and is essentially flush with the inside of door 26 of the motor control cabinet when the control unit is fully inserted into the compartment. As seen best in FIGS. 4 and 5, the upper surface of brace 36 is provided with a rectangular opening 36a adjacent the left-hand end thereof and in alignment with the web 56d when lever 56 is in its second position. The web 56d is deformed downwardly into an offset V-shape to provide a substantially vertical latching surface 56e joined by an angular camming surface 56f (FIG. 5). When lever 56 is pivotally swung from its first position (FIG. 4) to its second position (FIG. 3), camming surface 56f engages the upper forward edge of brace 36 to cam the left-hand or second end of lever 56 upwardly out of its normal plane whereupon the web 56d rides along the upper surface of brace 36. As the apex of web 56d passes beyond the forward edge of opening 36a, the web 56d drops into opening 36a and the latching surface 56e engages the forward edge of the opening 36a to latch the lever 56 in its second position parallel with the forward edge of brace 36. Lever 56 is also provided with a downwardly struck dimple 56g which crosses over a raised formation 36b on the upper surface of brace 36 when lever 56 is pivotally swung from its first position to its second position or vice versa to provide a detent for the lever. In the first position of lever 56 shown in FIG. 4, dimple 56g lies to the forward side of projection 36b to retain the lever in the first position. A downwardly turned flange 56h along the forward edge of lever 56 abuts the forward flange of brace 36 in the first position of the lever to limit the counteclockwise motion of the lever and thereby to cooperate with the detent 56g–36b in defining the first position of lever 56. A hole 56j is provided in lever 56 for accommodating the hasp of a padlock 60 which a workman may install to lock lever 56 in the first position for purposes that will be described hereinafter. Lever 56 is further provided with a pair of slots 56k and 56m, which respectively align with slots 36c and 36d in the upper surface of brace 36 when the lever 56 is in its second position for purposes that will also be described hereinafter.

Pan 22 has a shoulder pin 22d affixed to the underside thereof near its forward edge by riveting, welding or the like. Pin 22d extends downwardly into the plane of the pivoted lever 56 of the control unit. When the control unit is partially inserted into the motor control cabinet compartment as is shown in FIG. 4 slot 56a of lever 56 engages the pin 22d to limit insertion of the control unit to a depth wherein the stab-on connector fingers 39 of connector assembly 38 are aligned with the openings in insulator assembly 16, but are spaced from contact with the bus bars A, B and C. Assuming the padlock 60 shown in FIG. 4 is removed from the lever 56, the lever may be pivoted clockwise as viewed in FIG. 4 from its first position to its second position as viewed in FIG. 3. This movement of lever 56 causes the opposite edge of slot 56a to engage the rear surface of pin 22d, thereby camming the control unit into the compartment to drive the stab-on connectors 39 of the connector assembly 38 to engage with bus bars A, B and C. The final movement of the lever 56 to its second position causes the web 56d to ride over the upper surface of brace 36 and drop into the opening 36a such that the latching surface 56e engages the forward edge of opening 36a and latches the lever 56 in its second position, thereby also latching the control unit into its electrically engaged position with the bus bars A, B and C. Thus the control unit is automatically latched in position by the movement required to insert and electrically engage the control unit with the bus bars. It is not necessary for the installer to manipulate separate spring loaded latching means to accomplish the automatic latching. When it is desired to withdraw the control unit from the motor control center cabinet, the second or left-hand end of the lever 56 must be manually raised by the workman out of its normal plane to disengage the latching surface 56e from the aperture 36a. This done, the workman may then pivot the lever 56 counterclockwise as viewed in the drawings whereby the slot 56a will engage the forward edge or surface of pin 22d and drive the control unit outwardly of the cabinet to the position shown in FIG. 4 thereby disengaging the connectors 39 from the bus bars A, B and C.

Figure 6:
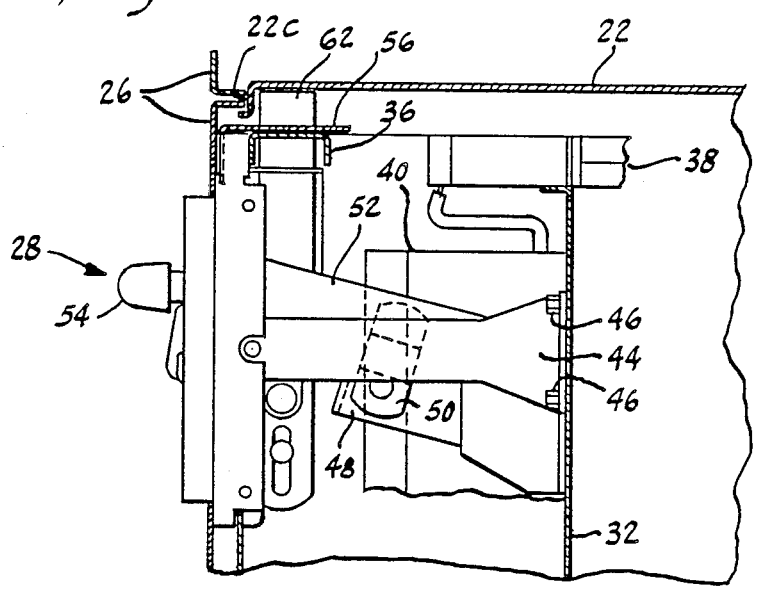
FIG. 6 is a cross-sectional view taken along the line 6—6 of FIG. 3 showing an operating mechanism and interlock structure for the control apparatus of the control unit.
Figure 7:
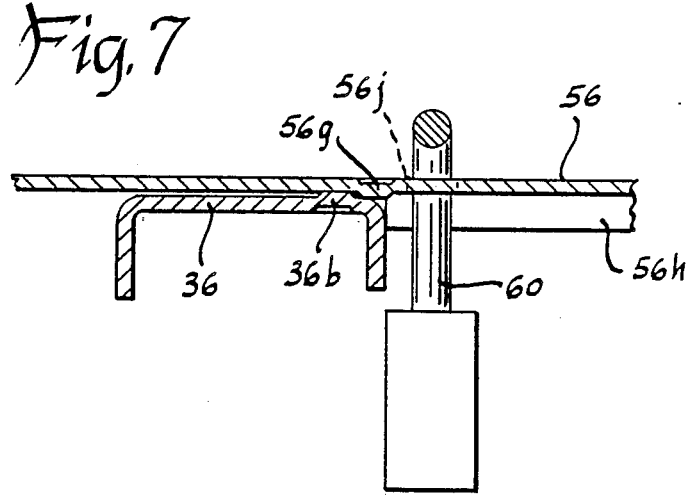
FIG. 7 is a fragmentary cross-sectional view taken along the line 7—7 in FIG. 4 showing a detent and a padlock provision for the latch lever of this invention.

The operator assembly 28 has a vertically oriented interlock bar 62 which is disposed for linear sliding motion in a vertical direction. While not specifically shown, the interlock bar 62 has a driving connection with the drive line to be in its raised position when the operator handle 54 is moved to its raised position for turning the control apparatus on. Interlock bar 62 is aligned with opening 36c in brace 36 and is also aligned with slot 56k in lever 56 when the lever is in the second position as shown in FIG. 3. Accordingly, when the control unit is fully inserted into the compartment and the control apparatus 40 is operated to its ON position by the operator assembly 28, the upper end of interlock bar 62 projects through the aligned openings 36c and 56k to project upwardly very near the bottom surface of the pan 22. As seen in FIG. 6, the upper end of interlock bar 62 in this position is also rearward of the front flange 22c of pan 22. When in the upper position, the interlock bar 62 prevents the lever 56 from being pivoted in the counterclockwise direction to the first position and therefore prevents the control unit connectors 39 from being separated from the bus bars A–C while the control apparatus 40 is in its ON condition. Inasmuch as the control unit may contain control apparatus of type or size other than the circuit breaker 40 exemplarily shown, the control unit is provided with means for mounting the operator assembly 28 in two additional positions, one of which is immediately to the right of the position illustrated whereby the interlock bar 62 would extend through the opening 36d in brace 36 and the aligned opening 56m in lever 56. In this position the interlock bar 62 functions to prevent movement of lever 56 in exactly the same manner described above. A second alternate position for the operator assembly 28 at the right-hand side of the control unit as viewed in the drawings. A third slot 36e is provided in the brace 36 near the right-hand end thereof to accommodate interlock bar 62 and a second set of holes 36f are provided in the forward flange of brace 36 for receiving screws 42 of the operator assembly. In this position the interlock bar 62 projects through the opening 36e as aforedescribed in conjunction with openings 36c and 36d when the operator 54 is moved upwardly to the ON position. When the interlock bar is in the raised position tongue 56b of lever 56 interfers with the forward edge of the projecting end of interlock bar 62 to prevent counterclockwise pivotal movement of the lever 56, thereby preventing movement of the lever and separation of connector clips 39 from the bus bars A–C while the control apparatus is in the ON condition. It will be appreciated that in any of the three positions for mounting the operator assembly 28, the interlock bar 62 will extend through the brace 36 when the operator 54 is moved to the ON position of the control apparatus to interfere with the pivotal movement of the lever 56 and will also interfere with the forward flange 22c of pan 22 to prevent full insertion of the control unit while the control apparatus is in the ON condition.

FIG. 8 shows still another condition for the control unit wherein the unit is only partially inserted, but the lever 56 has been moved to the latched position with respect to the brace 36. In this position a lateral edge of the first end of lever 56 abuts the pin 22d to limit insertion of the control unit to substantially the same depth as that shown in FIG. 4. Accordingly, the stab-on connectors 39 of connector assembly 38 are prevented from engaging the bus bars A, B and C.

In the event that a workman desires to disconnect the control unit from the bus bars for purpose of maintenance to the control unit or for testing purposes, he may move the lever 56 to the first position, thereby disengaging the connectors 39 from the bus bars A–C as shown in FIG. 4. To insure that the control unit stays in this position and is not inserted by another while he is repairing or testing equipment at a remote location, the padlock 60 may be locked in place as shown in FIG. 4 to prevent clockwise rotation of the lever 56 to the second position.

The foregoing has described a preferred embodiment of a latch for a removable control unit of a motor control center which operates to positively control the engagement or disengagement of the control unit plug-in connectors with the motor control center bus bars and to automatically latch the control unit in the motor control center cabinet when the lever is moved to engage the plug-in connectors with the bus bars, it is to be understood that the invention is susceptible of various modifications without departing from the scope of the appended claims.

I claim:

1. A latch for a removable control unit of a motor control center comprising, in combination:
    a cabinet having a plurality of forwardly opening compartments in a front face thereof and a plurality of bus bars within said cabinet traversing said compartments;
    control units individually slidably inserted in respective ones of said compartments from said forward opening, said control units each comprising electrical connector means for plug-in engagement with said bus bars upon full insertion of said control unit within said compartment;
    a lever pivotally mounted on said control unit for movement between a first position extending substantially in a direction of insertion of said control unit into said cabinet and a second position substantially parallel with said forward face of said cabinet, said lever having a first end extending rearwardly beyond said pivotal mounting when said lever is in said first position for engagement with a portion of said cabinet when said control unit is partially inserted into said compartment, said engagement of said first end of said lever with said portion of said cabinet effecting full insertion of said control unit into said compartment when said lever is moved from said first position to said second position; and
    catch means formed on a second end of said lever and on said control unit cooperably engagable when said lever is in said second position for retaining said lever in said second position and latching said control unit fully inserted in said compartment, said catch means comprising a recess and a projection received in said recess when said lever is in said second position, said lever being deflectable from its usual plane of movement for permitting said projection to enter said recess.

2. The invention defined in claim 1 wherein said projection comprises a cam surface for effecting said deflection of said lever as said lever is moved to said second position.

3. The invention defined in claim 2 wherein said projection is provided in said lever and said recess comprises an aperture in said control unit.

4. The invention defined in claim 1 wherein manual deflection of said lever for removing said projection from said recess is required to permit movement of said lever from said second position toward said first position.

5. A latch for a removable control unit of a motor control center comprising, in combination:
    a cabinet having a plurality of forwardly opening compartments in a front face thereof and a plurality of bus bars within said cabinet traversing said compartments;
    control units individually slidably inserted in respective ones of said compartments from said forward opening, said control units each comprising electrical connector means for plug-in engagement with said bus bars upon full insertion of said control unit within said compartment;
    a lever pivotally mounted on said control unit for movement between a first position extending substantially in a direction of insertion of said control unit into said cabinet and a second position substantially parallel with said forward face of said cabinet, said lever having a first end extending rearwardly beyond said pivotal mounting when said lever is in said first position of engagement with a portion of said cabinet when said control unit is partially inserted into said compartment, said engagement of said first end of said lever with said portion of said cabinet effecting full insertion of said control unit into said compartment when said lever is moved from said first position to said second position;
    catch means formed on a second end of said lever and on said control unit cooperably engagable when said lever is in said second position for retaining said lever in said second position and latching said control unit fully inserted in said compartment;
    detent means for said lever for maintaining said lever in said first position, said detent means comprising a protrusion on said lever for engaging cooperating means on said control unit, said cooperating means comprising a second protrusion, said lever being deflected from its usual plane of movement when said protrusion on said lever is moved across said second protrusion on said control unit.

6. A latch for a removable control unit of a motor control center comprising, in combination:
    a cabinet having a plurality of forwardly opening compartments in a front face thereof and a plurality of bus bars within said cabinet traversing said compartments;
    control units individually slidably inserted in respective ones of said compartments from said forward opening, said control units each comprising electrical connector means for plug-in engagement with said bus bars upon full insertion of said control unit within said compartment;

a lever pivotally mounted on said control unit for movement between a first position extending substantially in a direction of insertion of said control unit into said cabinet and a second position subtantially parallel with said forward face of said cabinet, said lever having a first end extending rearwardly beyond said pivotal mounting when said lever is in said first position for engagement with a portion of said cabinet when said control unit is partially inserted into said compartment, said engagement of said first end of said lever with said portion of said cabinet effecting full insertion of said control unit into said compartment when said lever is moved from said first position to said second position;

catch means formed on a second end of said lever and on said control unit cooperably engagable when said lever is in said second position for retaining said lever in said second position and latching said control unit fully inserted in said compartment; and wherein said control unit comprises electric control apparatus and a manual operator therefor, said operator comprising an interlock member movable to an extended position when said operator is moved to a position for energizing said control apparatus, said interlock member in said extended position engaging with said cabinet for preventing removal of said control unit from said cabinet, and said lever comprising means for engaging said interlock member in said extended position for preventing movement of said lever from said second position to said first position.

7. The invention defined in claim 6 wherein said lever and said control unit are provided with apertures aligned when said lever is in said second position and said interlock member extends through said apertures when said operator is moved to said position for energizing said control apparatus.

8. The invention defined in claim 6 wherein said first end of said lever abuts said interlock member in said extended position for preventing movement of said lever from one of said first or second positions to the other of said first or second positions.

* * * * *